United States Patent

Di Vita et al.

[15] 3,646,579

[45] Feb. 29, 1972

[54] LOGIC CIRCUIT PROBE WITH SCREW THREAD ADJUSTMENT AND INTERCHANGEABLE CIRCUITRY TO MATCH CIRCUIT BEING MONITORED

[72] Inventors: Philip S. Di Vita, Richboro; Earl N. Powers, Philadelphia; Charles J. Werneth, Newtown, all of Pa.

[73] Assignee: Data Display Systems, Inc.

[22] Filed: May 2, 1969

[21] Appl. No.: 821,288

[52] U.S. Cl. ............................... 324/72.5, 339/108 TP
[51] Int. Cl. ............................................. G01r 31/02
[58] Field of Search ............ 324/72.5, 149, 17; 339/108 TP, 339/263, 264

[56] References Cited

UNITED STATES PATENTS

| 1,108,674 | 8/1914 | Beck | 324/17 |
| 2,969,519 | 1/1961 | Thomas | 324/72.5 |
| 3,201,746 | 8/1965 | Askew | 324/72.5 |
| 3,447,078 | 5/1969 | Levy | 324/72.5 |
| 3,525,939 | 8/1970 | Cartmell | 324/72.5 |

OTHER PUBLICATIONS

McDonald, J. F., Logic Function Indicate Probe; IBM Technical Disclosure Bulletin; Vol. 8, No. 4; Sept. 1965 pp. 661–662
The Probe That Lights When a Pulse Goes By; Hewlett-Packard Measurement News; Nov.– Dec. 1968; pp. 1 and 4

Primary Examiner—Rudolph V. Rolinec
Assistant Examiner—R. J. Corcoran
Attorney—Synnestvedt & Lechner

[57] ABSTRACT

A probe for use with microelectronic circuitry characterized by a screw-actuated clamping mechanism which affords the probe structure diminished portions while providing superior pin-coupling and locking ability. The probe is of general utility; however, it includes design features which specifically complement its use in association with digital circuitry. In this respect, a logic pack of the type used in the circuit to be monitored is positioned in the probe housing and electrically connected in the input thereof. The logic pack is interchangeable to permit the characteristics of the probe to be directly matched to the circuit being monitored.

8 Claims, 3 Drawing Figures

PATENTED FEB 29 1972 3,646,579

INVENTOR,
ELMO M. GREGORY

BY Richard A Marsen
ATTORNEY

LOGIC CIRCUIT PROBE WITH SCREW THREAD ADJUSTMENT AND INTERCHANGEABLE CIRCUITRY TO MATCH CIRCUIT BEING MONITORED

This invention relates to a probe of the type used for electrical testing. The probe has particular utility in testing microelectric circuits. Microelectronic, or integrated, circuits have the advantage of an appreciable size reduction over circuits constructed of discrete components. The packing density of integrated circuit elements per circuit assembly may vary anywhere form several circuit elements per square inch to several hundred circuit elements per square inch. The interconnection of these circuit elements into circuit assemblies is conventionally effected by mounting the individual circuit elements on a ceramic substrate, each of which is in turn provided with projecting pins for mounting on a "mother board," or otherwise being interconnected such as by conventional wire-wrap techniques.

The high priority placed on the reduction in size is predicated upon a number of criteria not least of which is the desire to reduce the physical bulk of the equipment by employing integrated circuits; however, signal propagation time delays, heat dissipation and signal strength are other considerations which influence the trend toward microminiaturization.

The reduced size of the connecting pins of the integrated circuit elements makes unfeasible the use of conventional probe structures for the diagnostic analysis of equipment employing such elements. The approach taken in the design of conventional probes precludes any further reduction in size. Conventional probes utilize a spring-biased hook as a means of attaching these probes to a circuit to be monitored. A deficiency of conventional probes, attributable to their relative bulk, is there inability to be attached simultaneously to adjacent connecting pins of integrated circuit elements. Any appreciable reduction in size of the spring-biased hook in an attempt to alleviate this problem is effected at the expense of a reduction of mechanical advantage. Thus, as the size of the spring-biased hook of the probe is reduced sufficiently to enable the probe to be attached to adjacent pins, the restoring force of the spring is reduced to the point where the probe is susceptible to easy dislodgement.

The deficiencies of the prior art are obviated in the preferred embodiment of the present invention which incorporates a probe structure characterized by positive attachment and locking means. More specifically, the probe structure includes a screw-actuated mechanism, similar to that utilized in a mechanical pencil, to provide a positive attachment force, the magnitude of which is independent of the physical dimensions of the probe.

A primary object of the present invention is to provide a probe structure having superior electrical and mechanical characteristics for use with analog and digital analyzing and monitoring apparatuses.

In addition to their size deficiency, conventional probes are further inappropriate for use in conjunction with integrated circuits of the digital variety in that, being an outgrowth of an analog environment, the probe structure and associated test equipment are designed to measure, and in fact are calibrated, in terms which are for the most part totally unmeaningful to a logician attempting to perform a diagnostic trace on a digital network. The concern of the logician is that he get a readying from the test equipment that is truly representative of the signals being presented to the succeeding stage of the digital network being analyzed and unaffected by the probe itself. In the design of prior art probes, the fact that the logician thinks in terms of unit loads placed on the system rather than in terms of a measure of the impedance in the conventional terms of ohms and farads, is not taken into consideration.

To ensure that the electrical characteristics of a signal being monitored are not distorted by the input portion of the probe, an interchangeable logic pack is positioned within the probe structure. This interchangeable logic pack enables the probe structure to be matched to the equipment being monitored in a logical sense such that the probe represents one logical unit load to the circuit. Thus, whether the system being monitored is implemented in DTL, TTL, or TRL logic, or any of the other types of logic made available by the numerous manufacturers, the probe will be matched to the system and furthermore presents one logical unit load thereto since a logical gate constructed of corresponding logic elements is interchangeably positioned in the input portion of the probe structure.

Accordingly, it is another primary object of the present invention to provide a probe assembly for the analysis of digital networks including interchangeable logic packs to facilitate the matching of the electrical characteristics of the probe structure with those of the circuit being monitored.

Another advantage resulting from the matched logic concerns the manner in which the probe represents noise signals to the monitoring apparatus. Being matched to the circuit being monitored, the probe is sensitive only to those signal changes which can affect gates or flip-flops of that family. Thus the probe responds to noise fluctuations in just the same manner as the system logic, thus representing to the monitoring system the system's response to such signals.

The various objects and advantages of the invention will be fully understood upon reference to the following detailed description of the preferred embodiment of the invention when taken in light of the accompanying drawings in which is shown an electrical probe for testing microelectronic circuitry constructed in accordance with the teachings of this invention.

IN THE DRAWINGS

Figure 1:
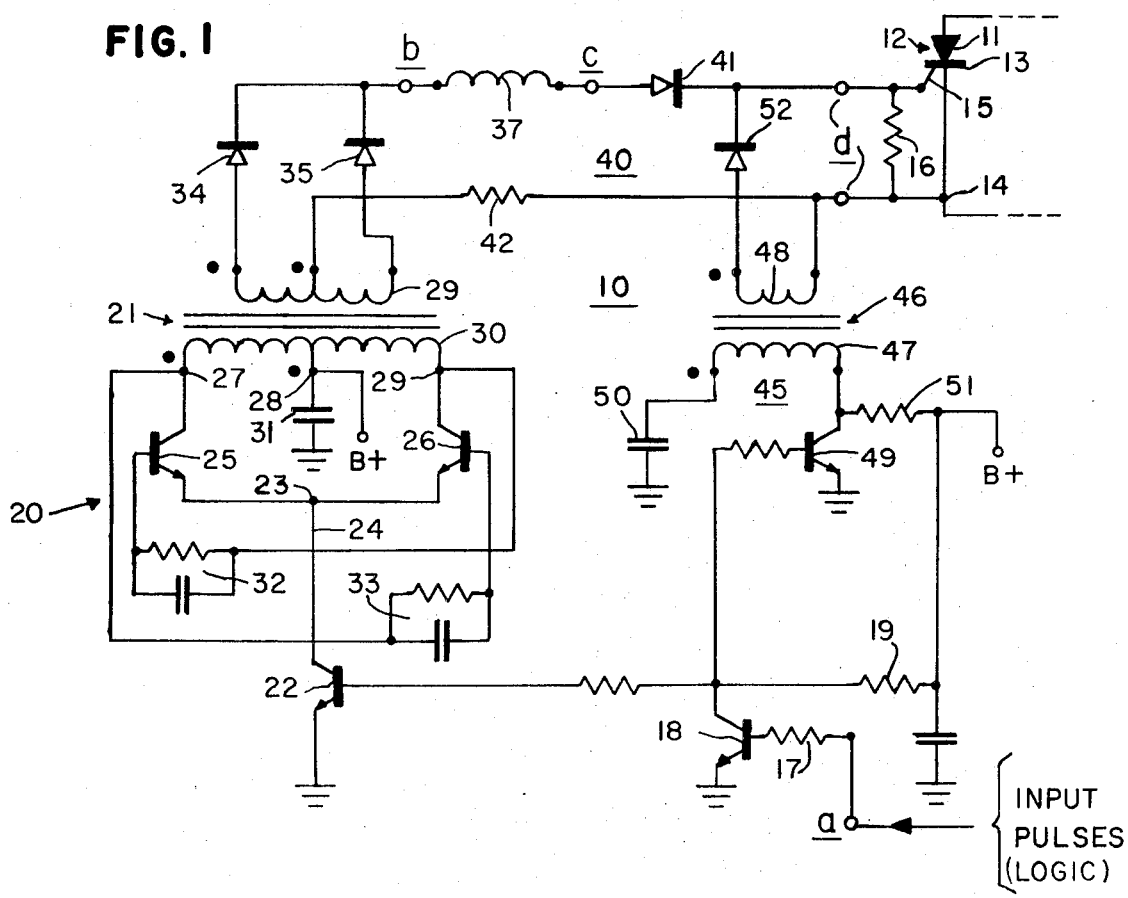
FIG. 1 is a view showing in partial cross section the operative components of the present invention.

Reference is now made to FIG. 1 which discloses, in partial cutaway fashion, the construction details of the subject probe. A housing 10 of plastic or other electrically insulative material is depicted as having a flexible electric cable 12 connected thereto. As indicated, the electrical cable 12 for connecting the probe to the monitoring apparatus, may be of variable length; however, for practical purposes the cable length should be standardized in instances where a plurality of probes are used to simultaneously monitor a single circuit configuration.

A connector 14 of conventional design is operatively connected to the other end of the flexible cable 12. The coupling member 14 is connected to a monitoring apparatus specifically design to analyze and display digital waveforms operative in the nanosecond time frame. Not being the subject of the present invention, the monitoring apparatus is not shown; however, that apparatus is the subject of a separate patent application of the same inventors, an application for U.S. Patent having been filed therefor under the title Digital Data Analysis And Display Device, filed May 2, 1969, and bearing Ser. No. 821,211.

Positioned partially within the housing 10, and projecting therefrom, is a reciprocally mounted contact element 16 constituting an elongated electrical conductive member having a hook configuration at the terminal portion thereof for encircling the corresponding contact portion of a circuit to be monitored. The projecting portion of the elongated member 16 is positioned within a conductive, cylindrically shaped, housing 18 which in turn constitutes a projection of the housing 10. The exterior surface of the cylindrical member 18 is insulatively covered with appropriate material 20 over all but its terminal portion. The uninsulated extremity of the cylindrical member 18 is slotted thereby permitting the hook portion of the contact member 16 to be withdrawn sufficiently therein such that the conductor of the circuit being monitored becomes totally encircled and is urged against the terminal portion of the conductive cylindrical housing 18 to thereby become locked to said probe.

An alternative construction is contemplated in which the cylindrically shaped member 18 constitutes an extension of the housing 10. In either embodiment the cylindrically shaped portion of the housing 10 need not be conductive in nature.

The elongated contact element 16 is anchored to a cross bar 22 positioned within the housing 10. The crossbar 22 is in turn coupled to a screw-type advancing mechanism comprising a threaded stud 24 and an internally threaded thumbwheel 26. The reciprocating contact member 16 is advanced and withdrawn by reversibly rotating the thumbwheel 26 thereby causing the threaded stud 24, the crossbar 22 and the attached contact member 16 to move forward or backward within the housing 10 as indicated in the drawing.

The elongated contact element 16 and associated advancing mechanism are electrically connected to a spring 28, the latter functions as a flexible conductor for insuring good electrical contact of the circuit elements located within the housing 10. The spring 28 is mounted on a bar 30 positioned within the housing 10. Further electrically connected to the bar 30 is an interchangeable logic pack 32 which seats within the body of the housing 10 as shown. Connecting means in the form of conventional friction-type fittings 34a, 34b and 34c are mounted on the logic pack 32 to enable the corresponding connecting leads 36a, 36b and 36c of the flexible cable 12 to be connected thereto. A ground wire 38, having attached thereto an alligator clip 40, is provided to complete the circuit configuration of the probe.

Figure 2:
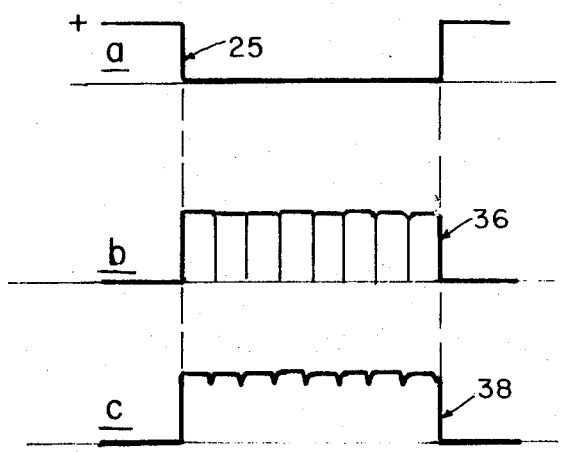
FIG. 2 depicts the subject of the invention in operative relationship with a microelectronic circuit under test.

Reference is now made to FIG. 2 which discloses a plurality of probe structures 10 a–b, constructed in accordance with the principles of the present invention, and connected to adjacent pins of a conventional dual in-line integrated circuit package 42. As indicated above, the prior art devices, in addition to being unmeaningfully matched to the circuit being monitored, are not capable of being connected to adjacent pins of the standard dual in-line packages, nor are such prior art devices capable of providing a positive locking action between the conductor of the circuit being monitored and the contact portion of the probe. The prior art probes, being spring biased and thus having a mechanical advantage directly proportional to the cross section of the material used in the construction of the spring, result in appreciably bulkier probes with less holding power than is realized from probes constructed in accordance with the principles of the present invention.

Figure 3:
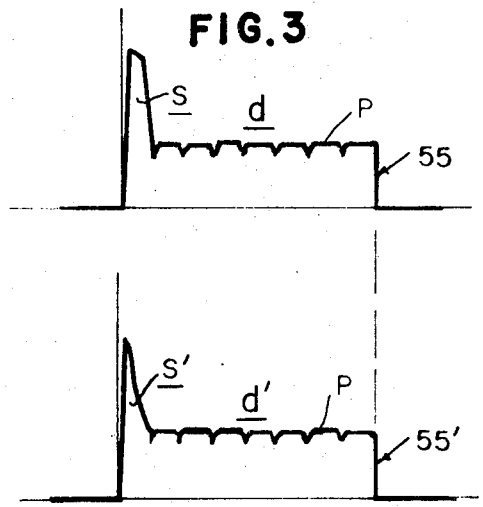
FIG. 3 is a diagrammatical representation of an interchangeable logic pack utilized in the implementation of the present invention.

FIG. 3 depicts in logical fashion the conventional representation of an AND gate which might be used to provide a unit load in the input circuit of the probe. Alternatively an inverter may be employed. The exact choice is up to the user; however, obviously desirable characteristics of the logic pack would be a unit logic load implemented in the type logic to be found in the circuit to be monitored.

It is this latter feature which is of prime significance to the logician desirous of performing an analysis of a digital circuit or system. In this respect conventional probes which are calibrated in terms of impedance, may have deleterious effects on the circuit to be analyzed such that the representation of the waveform being displayed may not correspond at all to the waveform presented to the circuit being monitored without the probe attached thereto. This deficiency is overcome in the present invention by tailoring the logic in the logic pack associated with the input of the probe to that of the system being monitored thereby providing a totally matched system and one wherein the probe itself will not adversely or independently affect the veracity of the input signal.

Although the preferred embodiment of the present invention has been explained in a manner which reflects particularly on the advantages of using the invention in connection with the analysis of digital waveforms and particularly integrated circuits, it should be readily apparent that the principles of the invention and in fact the probe structure itself, have broad applicability to other areas and industries. Thus, while in accordance with the provisions of the statutes, there has been illustrated and described the best forms of the invention known, it will be apparent to those skilled in the a art that changes may be made in the apparatus described without departing from the spirit of the invention as set forth in the appended claims and that in some cases, certain features of the invention may be used to advantage without a corresponding use of other features.

Having now described the invention, what is claimed as new and novel and for which it is desired to secure by Letters Patent is:

1. A probe for electrical testing comprising a conductive member, said conductive member further comprising a curved contact portion designed to at least partially encircle a portion of the circuit to be monitored, a housing for at least partially encompassing said conductive member, said housing including a projecting portion and a screw-type advancing mechanism positioned substantially internal to said housing, said screw-type advancing mechanism being designed to advance and retract said conductive member within said projecting portion of said housing to enable the curved contact portion of said conductive member to be advanced into at least partially encircling relationship with the portion of the circuit to be monitored and retracted to clamp the latter against the projecting portion of said housing.

2. A probe for electrical testing comprising a housing, a contact element including an end portion for engaging a circuit to be tested, the engaging portion of said contact element being designed to at least partially encircle the engaging portion of the circuit to be tested, means for mounting said contact element in a projecting relationship with respect to said housing and within a cylindrical portion thereof, means for reciprocatively moving said contact element within said cylindrical portion of said housing, said last named means further comprising a screw-type adjusting mechanism positioned substantially internal to said housing and attached to said contact element whereby said contact element may be initially advanced sufficiently to enable the engaging portion thereof to partially encircle the engaging portion of the circuit to be tested whereafter withdrawal of said elongated conductor results in a positive clamping of the circuit to be tested to the terminal portion of said cylindrical portion of said housing.

3. A probe for the electrical testing of microelectronic circuits of the digital variety, said probe being of the type comprising a housing, a contact element for engaging a circuit to be monitored and means for connecting said probe structure to a monitoring apparatus, the improvement comprising an interchangeable logic pack designed to represent one logical unit load to the circuit being tested, means within said housing for receiving said interchangeable logic pack, said last named means including means for interconnecting said contact element and said means for connecting said probe structure to a monitoring apparatus.

4. A probe as defined in claim 1 wherein means are provided within said housing for receiving an interchangeable electronic pack, said interchangeable electronic pack being designed to match the electrical characteristics of a circuit to be monitored.

5. A probe for electrical testing comprising a housing, an elongated electrically conductive member positioned within said housing and having a contact portion designed to engage a portion of a circuit to be monitored, a screw-type adjusting mechanism positioned substantially internal to said housing and operatively connected to said elongated electrically conductive member for reciprocatively moving the latter relative to said housing to thereby enable the contact portion of said elongated electrically conductive member to be brought into positive relationship with said circuit to be monitored and for clamping the engaged portion of said housing, and an interchangeable logic pack positioned within the probe housing and connected to said electrically conductive member, said logic pack being designed to match the type logic used in the implementation of the circuit being monitored and to present one logical unit load to said circuit.

6. A probe for electrical testing comprising an elongated conductor including a partially encircling contact portion designed to engage a portion of a circuit to be monitored, said partially encircling contact portion having a radius greater than the thickness of said conductor, a housing having a projecting conductive cylindrical portion, a nonconductive coating covering a substantial portion of the exterior surface of said projecting conductive cylindrical portion of said housing, means including a screw-actuated mechanism position internal to said housing for axially moving said elongated conductor within said housing, at least a portion of said projecting cylindrical portion of said housing being slotted to permit said partially encircling contact portion of said elongated conductor to be at least partially withdrawn into said slot whereby said elongated conductor may be initially advanced sufficiently to enable the contact portion thereof to partially encircle the engaging portion of a circuit to be tested whereafter withdrawal of said elongated conductor results in a positive clamping of the probe to the engaged portion of said circuit to be tested.

7. The probe structure of claim 1 wherein at least a portion of said projecting portion of said housing comprises an electrically conductive member.

8. The probe structure of claim 1 wherein the extremity of said projecting portion of said housing is slotted to thereby enable the contact portion of said conductive member to be withdrawn at least partially therein.

* * * * *

UNITED STATES PATENT OFFICE
CERTIFICATE OF CORRECTION

Patent No. 3,646,579      Dated February 29, 1972

Inventor(s) Philip S. Di Vita, Earl N. Powers and Charles J. Werneth

It is certified that error appears in the above-identified patent and that said Letters Patent are hereby corrected as shown below:

Col. 1, line 6, "microelectric" should be --microelectronic--;

Col. 2, line 53, "design" should be --designed--;

Col. 4, line 15, "the" should be --a--;

Col. 4, line 70, after "said" insert --circuit to be monitored to a projecting portion of said--;

Col. 5, line 4, after "radius" insert --substantially--.

Signed and sealed this 12th day of September 1972.

(SEAL)
Attest:

EDWARD M. FLETCHER, JR.
Attesting Officer

ROBERT GOTTSCHALK
Commissioner of Patents